United States Patent [19]

Wertman

[11] Patent Number: 5,793,442
[45] Date of Patent: Aug. 11, 1998

[54] BRIGHT FIELD DETECTOR

[75] Inventor: Dror Wertman, Haifa, Israel

[73] Assignee: CMT Medical Technologies Ltd., Haifa, Israel

[21] Appl. No.: 659,778

[22] Filed: Jun. 6, 1996

[30] Foreign Application Priority Data

Jun. 7, 1995 [IL] Israel ................................ 114052

[51] Int. Cl.$^6$ .................................................. H04N 5/32
[52] U.S. Cl. ........................ 348/673; 348/687; 348/678
[58] Field of Search ............................ 348/673, 687, 348/678; 378/98.2, 91, 99; H04N 5/32

[56] References Cited

U.S. PATENT DOCUMENTS 4,555,728  11/1985  Fenster et al. .................... 348/673
4,754,323  6/1988  Kaji et al. .......................... 358/44
5,144,646  9/1992  Gerlach ............................. 378/99
5,513,239  4/1996  Mulder ............................. 378/98.7

Primary Examiner—Glenton B. Burgess
Attorney, Agent, or Firm—Kenyon & Kenyon

[57] ABSTRACT

A method for enhancing the contrast of an interlaced video input including a series of input video cycles, each input video cycle having a plurality of input fields, one field in each cycle being a bright field, the method including detecting at least some of the bright fields and constructing a contrast enhanced, dynamic, video output image based on the detected bright fields. Preferably, the contrast enhanced, dynamic, video image includes a series of output video sequences, each output video sequence having a plurality of output fields corresponding to one of the detected bright fields.

21 Claims, 1 Drawing Sheet

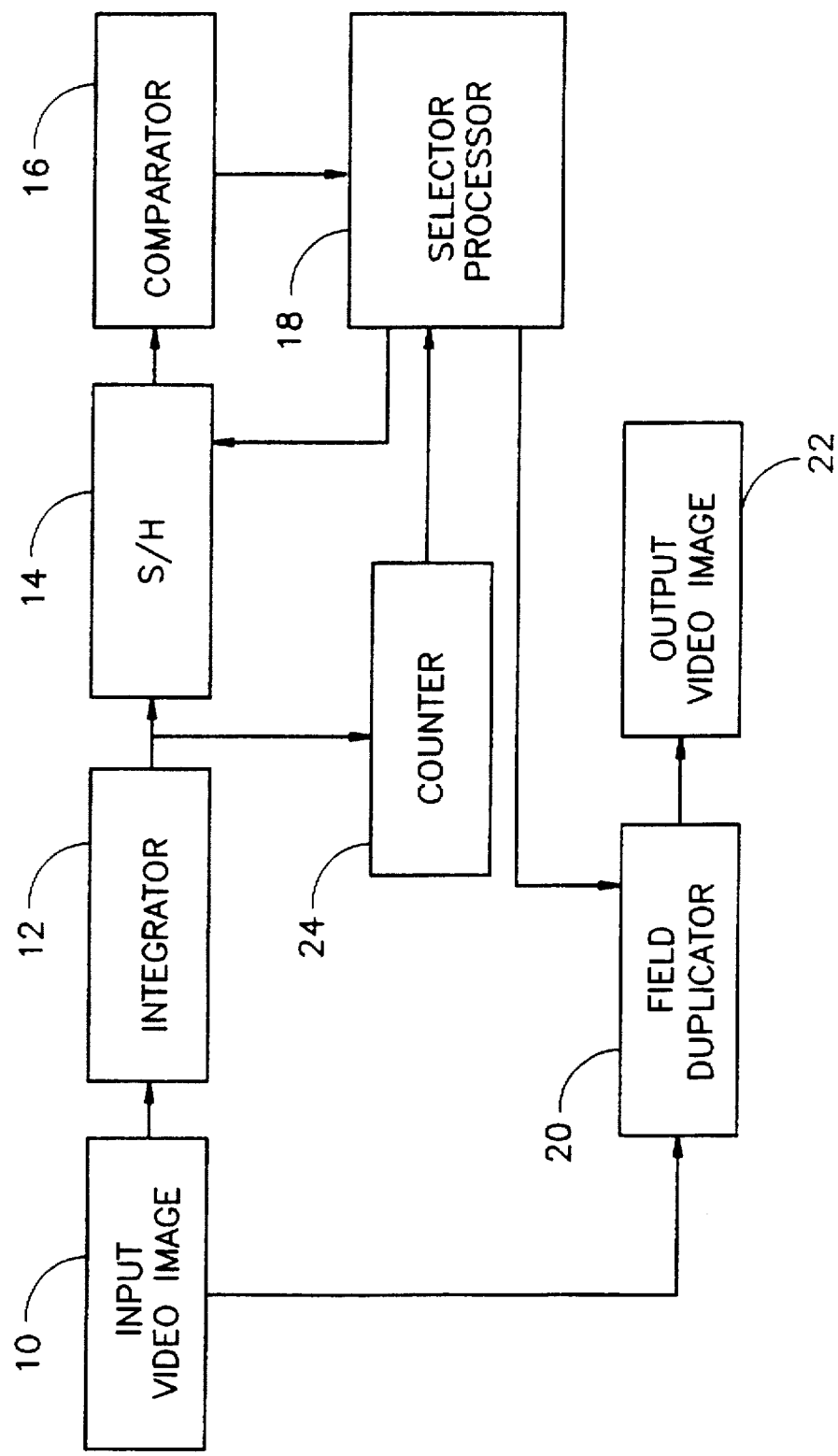

BRIGHT FIELD DETECTOR

FIELD OF THE INVENTION

The present invention relates generally to medical imaging apparatus and, more particularly, to a system and a method for contrast enhancement in dynamic medical imaging systems.

BACKGROUND OF THE INVENTION

Medical imaging apparatus such as digital fluorography systems are well known in the art. For imaging fast moving objects such systems operate in a dynamic mode of operation in which an interlaced video readout is used. The interlaced readout generally consists of 25–30 frames per second and each frame is defined by two fields. The X-ray exposure in dynamic imaging systems is typically continuous but may also be pulsed, as described in U.S. Pat. No. 4,555,728, in which case X-ray pulses are provided during extended retrace intervals between fields.

It should be noted that in pulsed X-ray systems, the number of fields between consecutive radiation pulses, hereinafter referred to as the X-ray cycle, varies from system to system and is generally larger than one. Typically there are two or four fields, i.e. one or two frames, respectively, in each cycle. In such systems, the first field of each cycle is dominant while the intensity of the remaining fields, e.g. the second field, is generally lower than 20 percent of the intensity of the first field. The first field is thus generally referred to as the "bright field" and the remaining fields may be referred to as the "secondary fields". Since most of the information defining the viewed image is carried by the bright fields, the secondary fields are not significant and only generate flicker in the viewed image.

SUMMARY OF THE INVENTION

The present invention seeks to provide a device and a method for enhancing the contrast of video images produced by fluorography imaging systems which operate in a dynamic mode of operation using pulsed X-ray radiation. The present invention is adapted to systems having an imaging cycle larger than one, i.e. systems which produce an interlaced readout of at least two fields between consecutive X-Ray pulses. According to the present invention, an output video image is constructed based exclusively on the bright fields of an input video image, i.e. the first field in each cycle, while the remaining, secondary, fields are discarded. The discarded secondary fields of are preferably replaced by fields corresponding to respective bright fields. Thus the number of fields in each cycle, typically 2 or 4 fields per cycle, is unchanged while the addition of bright fields enhances the contrast of the output image.

In a preferred embodiment of the invention, a bright field is detected by sampling a sequence of fields in the interlaced readout and determining which field in the sampled sequence has the highest intensity. The number of fields in the sampled sequence is preferably equal to a multiple of the number of fields in each cycle, e.g. 2 or 4 consecutive fields are sampled. The highest intensity field is assumed to indicate a bright field of the sequence. Once a bright field is detected, subsequent bright fields are readily identified by maintaining a count of the fields in the interlaced readout.

To avoid detection errors, the interlaced readout is preferably resampled after a predetermined period of time has lapsed from the initial sampling. For improved reliability, the readout may be resampled more than once, typically not more than twice, at predetermined time intervals and the results of the different samples are compared. This sampling procedure ensures correct detection of the bright fields.

Due to the gradual build-up nature of X-ray irradiation, as is known in the art, the field intensity of interlaced readouts typically increases asymptotically to a stable value. Therefore, the sampling procedure is preferably carried out only after a preselected number of initial fields, preferably 60 fields or more, are generated. The intensity of each field to be sampled is preferably determined by integrating over the field.

There is thus provided, in accordance with a preferred embodiment of the present invention, a method for enhancing the contrast of an interlaced video input including a series of input video cycles, each input video cycle including a plurality of input fields, one field in each cycle being a bright field, the method including:

detecting at least some of the bright fields; and constructing a contrast enhanced, dynamic, video output image based on the detected bright fields.

In a preferred embodiment of the present invention, the contrast enhanced, dynamic, video image includes a series of output video sequences, each output video sequence including a plurality of output fields corresponding to one of the detected bright fields.

Further, in accordance with a preferred embodiment of the present invention, there is provided a method for enhancing the contrast of an interlaced video input including a series of input video cycles, each input video cycle including a plurality of input fields, the method including:

sampling at least one sequence of input fields in the video input;

detecting a bright field in the at least one sequence of input fields;

selecting at least some of the input fields of the video input based on their location relative to the detected bright field; and constructing a contrast enhanced, dynamic, video output image based on the selected input fields.

In a preferred embodiment of the present invention, each of the at least one sequence of input fields includes two fields. Preferably, each of the at least one sequence of input fields includes four fields.

In a preferred embodiment of the invention, the contrast enhanced, dynamic, video image includes a series of output video sequences, each output video sequence including a plurality of output fields corresponding to one of the selected bright input fields. Preferably, the plurality of input fields in each input cycle includes two interlaced fields.

In a preferred embodiment of the present invention, sampling at least one sequence of fields includes sampling at least first and second sequences of input fields and wherein selecting at least some of the bright fields of the video input includes:

(a) comparing the locations of the bright fields in the first and second sequences; and (b) if the location of the bright field is the same in both the first and the second sequences, selecting fields from the video input based on the location of the bright field in the first and second sequences; and (c) if the location of the bright field in the second sequence is different from the location of the bright field in the first sequence:

sampling a third sequence of fields;

comparing the location of the bright field in the third sequence with those of the first and second sequences; and selecting fields from the video input based on the location of the bright field in the majority of the first, second and third sequences.

BRIEF DESCRIPTION OF THE DRAWING

The present invention will be better understood and appreciated from the following detailed description, taken in conjunction with the Figure which is a schematic, block diagram, illustration of a system for enhancing the contrast of images in dynamic medical imaging apparatus.

DETAILED DESCRIPTION OF PREFERRED EMBODIMENTS

Reference is now made to the Figure which schematically illustrates a system for enhancing the contrast of images in dynamic medical imaging apparatus. As shown in the Figure, the system receives a video input 10 consisting of input frames, each input frame being preferably represented by two interlaced input fields, as is known in the art. In a preferred embodiment of the invention, the video input consists of a series of imaging cycles, each imaging cycle including a plurality of consecutive input fields, wherein each imaging cycle represents an image of one, respective, X-ray exposure pulse.

An integrator 12 integrates over each input field of video input 10 and provides outputs corresponding to the intensities of the input fields. A counter 24 in communication with a selector processor 18, as described in detail below, maintains a count of the number of fields integrated by integrator 12. The video input is also received by a field duplicator 20 which is adapted to generate one or three duplicate fields, depending on the choice of a two field per cycle system or a four field per cycle system, as described in detail below.

In a preferred embodiment of the present invention, the integrated fields from integrator 12 are sampled by a sample-and-hold (S/H) circuit, the activation of which is controlled by selector processor 18. In a preferred embodiment of the invention, S/H 14 is activated by selector processor 18 only after a predetermined number of initial fields have been counted by counter 24, at which time the video input is substantially stable as known in the art. When activated, S/H 14 samples a sequence of two or four consecutive fields, depending on the number of fields in each cycle, and holds the intensities of the sampled fields. It should be appreciated that, since each sampled sequence includes at least the number of fields per cycle, a bright field is necessarily present in each sequence. The intensities of the sampled fields are compared by a comparator 16 and the field having the largest intensity is identified by selector processor 18 to be the bright field. The location of the suspect bright field in the sampled sequence, e.g. first, second, third or fourth for a sequence of four fields, is preferably stored in a memory of selector processor 18.

It is appreciated, however, that occasional noise and/or extreme changes in the video image may result in false detection of the bright field based on the output of comparator 16. Therefore, a preferred embodiment of the present invention employs a resampling procedure which confirms the identity of the bright field. According to the preferred resampling procedure, S/H 14 is reactivated after a predetermined number of fields, for example 20 fields, from the first sampling, based on the count of counter 24. The number of fields between samplings is preferably programmable by the user. If the comparison result of the second sampling is the same as that of the first sampling, i.e. the first and second samplings indicate the same bright field location, the procedure is completed and the bright field selected in the first sampling is maintained.

However, if the second sampling yields a different result, i.e. a different bright field location, S/H 14 is once again reactivated after a predetermined number of fields from the second sampling. In this case the bright field is reselected on a "majority decision" basis, whereby the result of either the first or second sampling is selected depending on the result of the third sampling. It has been found that selection of the bright fields in this manner is virtually certain and no further sampling is required, even in systems using more than two fields, typically four fields, per imaging cycle.

Once the bright field locations have been confirmed, a reconstructed, contrast enhanced, image may be produced as follows. Field duplicator 20, which preferably includes a double-buffered or a dual-port memory, receives synchronization signals from selector processor 18, which signals provide the duplicator with the confirmed locations of the bright fields. In response to the synchronization signals, field duplicator 20 stores only the confirmed bright fields while the remaining fields, hereinafter referred to as secondary fields, are discarded. Typically, there are one or three secondary fields per cycle, depending on the choice of a two-field-per-cycle or a four-field-per-cycle system. Field duplicator 20 then produces duplicates of each bright field which are inserted in place of the discarded secondary fields. The duplicate bright fields are preferably appropriately spatially shifted to be interlaced with the bright fields in the same manner as the respective, discarded, secondary fields. Thus, a contrast enhanced video output 22 consisting of the reconstructed frames is produced by field duplicator 20.

The present invention has been described above in a context of a dedicated hardware system. However, it should be appreciated that at least some aspects of the present invention may be executed by computer software, as is well known in the art.

It will be appreciated by persons skilled in the art that the present invention is not limited by what has been particularly shown and described hereinabove. Rather, the scope of the present invention is defined only by the claims which follow:

I claim:

1. A method for constructing a contrast enhanced, dynamic, video output image from an interlaced video input comprising a series of input video cycles, each input video cycle including a plurality of input video fields, one field in each cycle being a bright field having a substantially greater brightness than the other fields in the cycle, the method comprising the steps of:

detecting the bright field in one or more of the video cycles; and constructing the contrast enhanced, dynamic, video output image so as to substantially comprise image information from the detected bright fields.

2. A method according to claim 1 wherein said contrast enhanced, dynamic, video image comprises a series of output video sequences, each output video sequence including a plurality of output fields corresponding to one of said detected bright fields.

3. A method for enhancing the contrast of an interlaced video input comprising a series of input video cycles, each input video cycle including a plurality of input fields, the method comprising:

sampling at least one sequence of input fields in said video input;

detecting a bright field in said at least one sequence of input fields;

selecting at least some of the input fields of the video input based on their location relative to the detected bright field; and constructing a contrast enhanced, dynamic, video output image based on the selected input fields.

4. A method according to claim 3 wherein each of said at least one sequence of input fields comprises two fields.

5. A method according to claim 4 wherein each of said at least one sequence of input fields comprises four fields.

6. A method according to claim 3 wherein said contrast enhanced, dynamic, video image comprises a series of output video sequence, each output video sequence including a plurality of output fields corresponding to one of the selected bright input fields.

7. A method according to claim 4 wherein said contrast enhanced, dynamic, video image comprises a series of output video sequences, each output video sequence including a plurality of output fields corresponding to one of the selected bright input fields.

8. A method according to claim 5 wherein said contrast enhanced, dynamic, video image comprises a series of output video sequences, each output video sequence including a plurality of output fields corresponding to one of the selected bright input fields.

9. A method according to claim 3 wherein said plurality of input fields in each input cycle comprises two interlaced fields.

10. A method according to claim 4 wherein said plurality of input fields in each input cycle comprises two interlaced fields.

11. A method according to claim 5 wherein said plurality of input fields in each input cycle comprises two interlaced fields.

12. A method according to claim 6 wherein said plurality of input fields in each input cycle comprises two interlaced fields.

13. A method according to claim 7 wherein said plurality of input fields in each input cycle comprises two interlaced fields.

14. A method according to claim 8 wherein said plurality of input fields in each input cycle comprises two interlaced fields.

15. A method according to claim 3 wherein sampling at least one sequence of fields comprises sampling at least first and second sequences of input fields and wherein selecting at least some of the bright fields of the video input comprises:

(a) comparing the locations of the bright fields in said first and second sequences; and (b) if the location of the bright field is the same in both the first and the second sequences, selecting fields from the video input based on the location of the bright field in said first and second sequences; and (c) if the location of the bright field in the second sequence is different from the location of the bright field in the first sequence:

sampling a third sequence of fields;

comparing the location of the bright field in the third sequence with those of the first and second sequences; and selecting fields from the video input based on the location of the bright field in the majority of said first, second and third sequences.

16. A method according to claim 4 wherein sampling at least one sequence of fields comprises sampling at least first and second sequences of input fields and wherein selecting at least some of the bright fields of the video input comprises:

(a) comparing the locations of the bright fields in said first and second sequences; and (b) if the location of the bright field is the same in both the first and the second sequences, selecting fields from the video input based on the location of the bright field in said first and second sequences; and (c) if the location of the bright field in the second sequence is different from the location of the bright field in the first sequence:

sampling a third sequence of fields;

comparing the location of the bright field in the third sequence with those of the first and second sequences; and selecting fields from the video input based on the location of the bright field in the majority of said first, second and third sequences.

17. A method according to claim 5 wherein sampling at least one sequence of fields comprises sampling at least first and second sequences of input fields and wherein selecting at least some of the bright fields of the video input comprises:

(a) comparing the locations of the bright fields in said first and second sequences; and (b) if the location of the bright field is the same in both the first and the second sequences, selecting fields from the video input based on the location of the bright field in said first and second sequences; and (c) if the location of the bright field in the second sequence is different from the location of the bright field in the first sequence:

sampling a third sequence of fields;

comparing the location of the bright field in the third sequence with those of the first and second sequences; and selecting fields from the video input based on the location of the bright field in the majority of said first, second and third sequences.

18. A method according to claim 6 wherein sampling at least one sequence of fields comprises sampling at least first and second sequences of input fields and wherein selecting at least some of the bright fields of the video input comprises:

(a) comparing the locations of the bright fields in said first and second sequences; and (b) if the location of the bright field is the same in both the first and the second sequences, selecting fields from the video input based on the location of the bright field in said first and second sequences; and (c) if the location of the bright field in the second sequence is different from the location of the bright field in the first sequence:

sampling a third sequence of fields;

comparing the location of the bright field in the third sequence with those of the first and second sequences; and selecting fields from the video input based on the location of the bright field in the majority of said first, second and third sequences.

19. A method according to claim 9 wherein sampling at least one sequence of fields comprises sampling at least first and second sequences of input fields and wherein selecting at least some of the bright fields of the video input comprises:

(a) comparing the locations of the bright fields in said first and second sequences; and (b) if the location of the bright field is the same in both the first and the second sequences, selecting fields from the video input based on the location of the bright field in said first and second sequences; and (c) if the location of the bright field in the second sequence is different from the location of the bright field in the first sequence:

sampling a third sequence of fields;

comparing the location of the bright field in the third sequence with those of the first and second sequences; and selecting fields from the video input based on the location of the bright field in the majority of said first, second and third sequences.

20. A method according to claim 10 wherein sampling at least one sequence of fields comprises sampling at least first and second sequences of input fields and wherein selecting at least some of the bright fields of the video input comprises:

(a) comparing the locations of the bright fields in said first and second sequences; and (b) if the location of the bright field is the same in both the first and the second sequences, selecting fields from the video input based on the location of the bright field in said first and second sequences; and (c) if the location of the bright field in the second sequence is different from the location of the bright field in the first sequence:

sampling a third sequence of fields;

comparing the location of the bright field in the third sequence with those of the first and second sequences; and selecting fields from the video input based on the location of the bright field in the majority of said first, second and third sequences.

21. The method of claim 1, wherein the contrast enhanced image comprises substantially only bright fields.

* * * * *